United States Patent [19]

Rhein et al.

[11] 3,919,172

[45] Nov. 11, 1975

[54] METHOD OF PREPARING POLYESTERS FROM POLYMERIC POLYOLS AND DIANHYDRIDES

[75] Inventors: Robert A. Rhein; John D. Ingham, both of La Canada, Calif.

[73] Assignee: California Institute of Technology, Pasadena, Calif.

[22] Filed: Oct. 30, 1972

[21] Appl. No.: 301,794

[52] U.S. Cl............ 260/75 R; 260/63 R; 260/75 A; 260/75 UA
[51] Int. Cl................................. C08g 17/10
[58] Field of Search.. 260/63 R, 75 R, 75 A, 75 UA

[56] References Cited
UNITED STATES PATENTS

| | | | |
|---|---|---|---|
| 3,213,063 | 10/1965 | Horan et al. | 260/63 |
| 3,247,146 | 4/1966 | Royston | 260/27 |
| 3,459,584 | 8/1969 | Caldwell | 117/72 |
| 3,600,406 | 8/1971 | Touval | 260/346.3 |
| 3,674,724 | 7/1972 | Marzocchi | 260/3 |
| 3,692,744 | 9/1972 | Rich et al. | 260/75 |

Primary Examiner—Lester L. Lee
Attorney, Agent, or Firm—Marvin E. Jacobs

[57] ABSTRACT

New highly stable, elastomeric polymers are prepared under mild reaction conditions by chain extension of hydroxy-terminated liquid prepolymers such as polyalkylene oxides or polybutadienes with anhydrides such as tetrahydrofuran tetracarboxylic dianhydride, pyromellitic dianhydride, and benzophenone tetracarboxylic dianhydride. Chain extension at 60°C was provided in the presence of ferric acetyl acetonate as catalyst. The anhydride reactants are difunctional as anhydrides but tetrafunctional under conditions selected that lead to the reaction of all carboxyl groups. Thus, chain extension can be effected and then followed by cross linking via the residual carboxyl groups.

14 Claims, 3 Drawing Figures

METHOD OF PREPARING POLYESTERS FROM POLYMERIC POLYOLS AND DIANHYDRIDES

ORIGIN OF THE INVENTION

The invention described herein was made in the performance of work under a NASA contract and is subject to the provisions of Section 305 of the National Aeronautics and Space Act of 1958, Public Law 83-568 (72 Stat. 435; 42 USC 2457).

BACKGROUND OF THE INVENTION

1. Field of the Invention

This invention relates to stable, elastomeric polymers and more particularly to polymers prepared by the chain extension of hydroxy-terminated prepolymers with anhydrides.

2. Description of the Prior Art

Thermally and chemically stable polymers are required for materials applications, particularly highly stable, elastomeric systems for solid-propellant binders applicable to long-term planetary missions. Achieving this objective requires dimensional and mechanical stability as well as insensitivity to radiation. Furthermore, such elastomers should evolve a minimum of volatile products. Polyurethanes are generally used in most of these applications. Though polyesters are generally more stable than polyurethanes, previous work has indicated that chain extension is limited and reaction conditions are relatively severe in order to form such polymers.

Previous work reported at JPL SPS 37-52, Vol. III, pp. 97-98, 1968, has demonstrated that anhydrides can be used to chain-extend hydroxy-terminated prepolymers. However, the molecular weights were low and the reaction conditions were unduly severe. Efforts to increase molecular weights and also to moderate the reaction conditions by use of known ester forming catalysts were found to provide negligible catalytic effect.

SUMMARY OF THE INVENTION

It has now been discovered in accordance with the invention that certain polyfunctional anhydrides such as tetrahydrofuran tetracarboxylic dianhydride, pyromellitic dianhydride and benzophenone tetracarboxylic dianhydride provide effective chain extension of hydroxy-terminated prepolymers such as poly(ethylene oxides) and poly(butadienes) under specified conditions. Chain extension at 60°C is provided by the use of ferric acetyl acetonate as catalyst. The anhydride reactants are difunctional as anhydrides but tetrafunctional if conditions are selected that lead to reaction of all carboxyl groups. Therefore, chain extension can be effected and then followed by cross linking via the residual carboxyl groups. The anhydride-hydroxyl mole ratio should be in the vicinity of 1.05 for maximum chain extension.

Use of the particular dianhydrides provides a chemical polymerization reaction system where the formation of volatile by-products is kept to a minimum. In addition, the use of tetrafunctional dianhydrides makes it possible to operate in terms of partially esterified anhydride product systems formed below a certain temperature, and above this temperature further ring opening occurs followed by esterification leading to a cross-linked network. Thus, chain extension can be effected to form an intermediate polymer which can be coated, molded, cast and then cross-linked in place by further reaction of residual carboxyl groups or by addition of additional amounts of polyfunctional polyol reactants.

These and many other attendant advantages of the invention will become apparent as the invention becomes better understood by reference to the following detailed description when considered in conjunction with the accompanying drawings.

DESCRIPTION OF THE PREFERRED EMBODIMENTS

Figure 1:
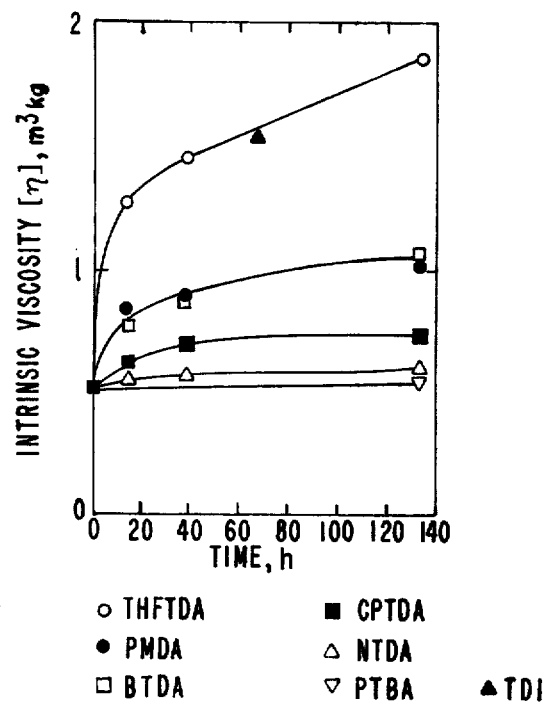
FIG. 1 is a series of graphs of solution viscosity of anhydride chain-extended poly(propylene oxide)

The stable elastomers are prepared by the chain extension reaction of certain tetrafunctional dianhydrides with liquid polymeric di- or polyols.

The reaction can be illustrated by

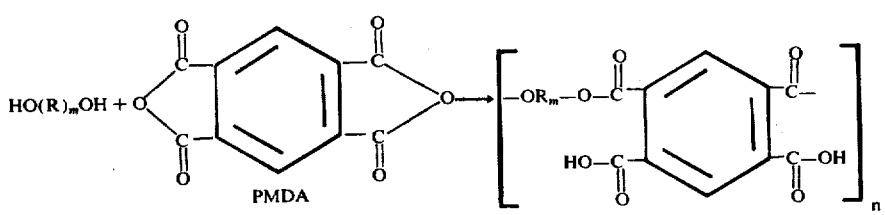

where R is an organic monomeric group in the prepolymer, $m$ is the prepolymer degree of polymerization (d.p.) and $n$ is the d.p. of the extended polymer. When an excess of hydroxyl substituted prepolymer is present, the unreacted carboxyl groups are esterified to form cross-linked polymers.

The equivalent weight of the liquid prepolymer is at least 1,000 and not usually more than 5,000. The functionality of the prepolymer is advantageously from about 1.7 to about 3.0, preferably from about 1.9 to 2.3 to form by cross-linking and chain extending final elastomeric polymers of molecular weight of at least 20,000, preferably at least 50,000. Since higher molecular weight prepolymers may require heat to reduce viscosity, the molecular weight is preferably from 1,000 to 3,000.

The liquid hydroxyl terminated prepolymers are preferably of the type that form elastomeric polymers, suitably hydroxyl terminated polymeric dienes or polyether glycols such as polyethylene glycol, polypropylene glycol and higher alkylene oxide adducts of aliphatic glycols and triols.

The liquid prepolymers of the diene elastomer type are, for example, homopolymers or copolymers of a conjugated diene containing from 4–12 carbon atoms, such as 1,3-butadiene, isoprene, 2,3-dimethyl-1,3-butadiene, 1,3-pentadiene (piperylene), 3-methyl-1,3-pentadiene and the like. In the case of a diene copolymer, the comonomer should not exceed 35% of the polymer in order to preserve elastomeric properties. Suitable comonomers are vinyl substituted aromatic and aliphatic compounds, such as acrylonitrile, styrene and the like.

The polybutadiene polymer may be hydrogenated to provide increased stability in high temperature environments or the prepolymer may be formed from saturated hydrocarbon prepolymers such as hydroxyl terminated polypropylenes, polybutylenes or polyisobutylenes.

A minor amount, below about 10% by weight, of a triol such as trimethylolethane or glycerol triricinoleate may be present to control the degree of cross-linking between polymeric chains. Cross-linking between chains may also be provided by the presence of metallic oxides such as zinc oxide or cadmium oxide which would react with some of the free carboxyl groups to form salt crosslinks and may also tend to increase chemical stability of the polymer.

The tetrafunctional dianhydride may be selected from compounds of the formula:

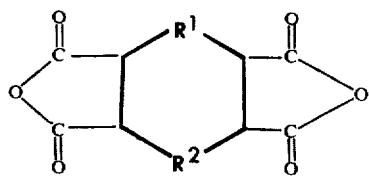

where $R^1$ is $(CH_2)_n$, divalent oxygen, monocyclic arylene such as phenylene or aryl keto aryl, and $R^2$ is a divalent bond or $(CH_2)_n$ where $n$ is 0 or 1. Suitable dianhydrides are listed in the following table.

dianhydride (CPTDA) and perylene tetracarboxylic dianhydride (PTBA) show little effect in chain extension reactions.

Catalysts are necessary to increase reaction rate and reduce reaction temperature. Tertiary amines such as imidazole have been utilized for the reaction of PMDA with alcohols for hydroxyl analytical methods. When the imidazole was tested as a catalyst for the reaction of polypropylene oxide (PPO) with PMDA, the desired catalytic effect was found to be negligible at a catalyst concentration of 0.2 per mole of PMDA.

There are two functions of a catalyst in systems of this type. Not only should it increase the rate of the desired chain-extension reaction, but is is also desirable that it increase this rate relative to side-reaction rates. Therefore, although imidazole was found to increase the chain-extension rate at times shorter than 24 hours, the final molecular weight for longer cure times was no higher when it was present, indicating that side reaction rates were also catalyzed. When short reaction times are desired, as for analytical methods, imidazole is an effective catalyst for anhydride-hydroxyl reaction. Further experiments show that imidazole, pyrole and pyridine did not give higher values of molecular weight than no catalyst for cure times from 14 to 134 hours at 333°K (60°C) with a mole ratio of PMDA to PPO of 1.05.

However, metal acetyl acetonates such as iron, copper or nickel acetyl acetonates are effective catalysts for the desired chain-extension reaction. Ferric acetyl acetonate is the most effective catalyst providing polymers having highest intrinsic viscosity at the lowest temperatures and in the shortest reaction periods. The mole ratio of catalyst to anhydride is suitably from 0.001 to 0.5, preferably from 0.02 to 0.2.

The anhydride-hydroxyl mole ratio is maintained near stoichiometric suitably with a slight excess of less than 10% of anhydride. For maximum chain extension, the molar ratio of anhydride/hydroxyl is relatively critical at a value of 1.05. The value is less than the value of 1.10, generally used for NCO/OH ratios when forming the analogous polyurethane linked products.

TABLE I

| Compound | Abbreviation | Structure |
|---|---|---|
| Tetrahydrofuran tetracarboxylic dianhydride | THFTDA | |
| Pyromellitic dianhydride | PMDA | |
| Benzophenone tetracarboxylic dianhydride | BTDA | |

Other anhydrides such as napthalene tetracarboxylic dianhydride (NTDA), cyclopentane tetracarboxylic The reaction in the presence of the specified catalyst and in the specified proportions can be effectively conducted in reasonable time periods at temperatures of less than 100°C, preferably at temperatures less than 75°C, typically from 40° to 80°C, to form chain-extended polymeric products. At higher temperatures of at least 100°C, carboxyl group reaction is favored and cross-linked, gelled products are produced. Higher initial temperatures of the order of 175° to 195°C with stirring may be necessary to dissolve the anhydride in the prepolymer. The catalyst is then added and the solution cured in a vacuum oven at the desired reaction temperature.

Approximate intrinsic viscosities were determined from the expression $\eta_{sp}/C = [\eta] + 0.39\ [\eta]^2 C$ from measurements at one concentration in benzene-dimethylformamide at 30°C. This relationship was determined for diisocyanate-linked polymers and was reported in J. Poly. Sci., Vol. I (3), 272-282 (1959). The relationship is strictly valid only for PPO-toluene diisocyanate (TDI) polymers. However, the relationship is used herein for comparison for anhydride polymers with the values obtained for PPO-TDI polymers as an approximation of the degree of chain extension.

Most of the following experiments were conducted with a polypropylene oxide having a molecular weight of 2,000 (PPG 2025) and a hydroxyl content of 1.0 eq./kg as the diol. In a first series of experiments, various anhydrides and TDI in a mole ratio of AN/OH of 1.05 were reacted with PPG 2025 in bulk in absence of catalyst at 333°K (60°C). The reactants were first heated to 176°C to obtain solution and then cooled to 60°C and cured at this temperature in a vacuum oven. The results are illustrated in FIG. 1.

It can be seen from FIG. 1 that THFTDA resulted in the highest molecular weights and was as effective as TDI under these conditions. NTDA and PTBA which do not contain the claimed structure for the anhydride were not effective in chain extending PPG 2025, perhaps due to the fact that the rate of chain extension may depend on the solubility parameters of anhydride and diol.

A further series of experiments were carried out in bulk utilizing PMDA and PPG 2025 to determine the effect of various catalysts on chain extension. The results are tabulated below.

TABLE II

| Catalyst | Mole Ratio OH/AN | Mole Ratio Cat/AN | C, dl/g | Time, Hr. | Temp. | $[\eta]$ m³/kg |
|---|---|---|---|---|---|---|
| None | 1.00 | | 1.895 | 0.5 | Ambient | .0777 |
| None | 0.95 | | 3.45 | | 60°C | .0833 |
| None | 1.00 | | 2.253 | 6 | 100°C | .1028 |
| Imidazole | 1.00 | 0.2 | 1.894 | 41 | Ambient | .1274 |
| Imidazole | 1.00 | 0.2 | 2.098 | 44 | 100°C | .1353 |
| Pyrole | 0.95 | 0.2 | 2.801 | 14 | 60°C | .1037 |
| Pyridine | 0.95 | 0.2 | 2.58 | 14 | 60°C | .1017 |
| Imidazole | 0.95 | 0.2 | 2.56 | 14 | 60°C | .0884 |
| Fe(AA)₃ | 0.95 | 0.2 | 2.619 | 66 | 60°C | .2334 |
| Fe(AA)₃ | 0.95 | 0.02 | 2.156 | 40 | 60°C | .0935 |
| Fe(AA)₃ | 0.95 | 0.002 | 3.515 | 40 | 60°C | .0877 |

TABLE II-continued

| Catalyst | Mole Ratio OH/AN | Mole Ratio Cat/AN | C, dl/g | Time, Hr. | Temp. | $[\eta]$ m³/kg |
|---|---|---|---|---|---|---|
| Fe(AA)₃ | 0.95 | 0.2 | 3.461 | 66 | 72°C | .2407 |

The above data demonstrates that imidazole and other tertiary amines such as pyrole and pyridine have negligible effect on chain extension of prepolymeric diols. There is a negligible difference in intrinsic viscosity for cure times from 14 to 134 hours at 60°C at a mole ratio of PMDA/PPG 2025 of 1.05. The intrinsic viscosities were always 1.1(±0.3)m³/kg under these conditions.

However, the presence of ferric acetyl acetonate (FeAA) resulted in an intrinsic viscosity of ~2.4 m³/kg in 66 hr. at 333°K. The ratio of FeAA/anhydride was 0.2; thus, the catalyst concentration was higher and the effect less than for isocyanate-hydroxyl reactions. In an experiment in which the FeAA to anhydride or diisocyanate ratio was 0.002, the extended anhydride and isocyanate polymers $[\eta] = 1.8$ and 8.8 m³/kg respectively. However, the reactant ratio was probably more nearly optimum for the urethane polymer, accounting for part of the larger increase in molecular weight.

Further experiments were carried out in bulk utilizing THFTDA to chain extend PPG 2025 in the presence of FeAA, NiAA or CuAA in a molar ratio of 0.2 catalyst/AN. The results are shown in FIG. 2.

Figure 2:
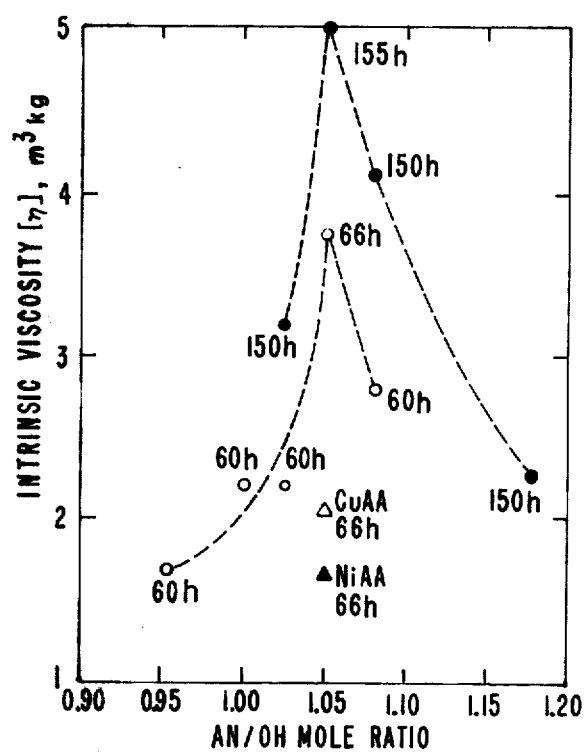
FIG. 2 is a graph of solution viscosity of anhydride-poly(propylene oxide) versus anhydride to hydroxyl mole ratio.

From FIG. 2, it can be seen that the anhydride-hydroxyl mole ratio is in the vicinity of 1.05 for maximum chain extension. The value appears to be relatively critical and somewhat less than the value of 1.10 generally used for NCO/OH ratios. FIG. 2 also shows that FeAA is a much more effective catalyst for anhydride extension than CuAA or NiAA.

Figure 3:
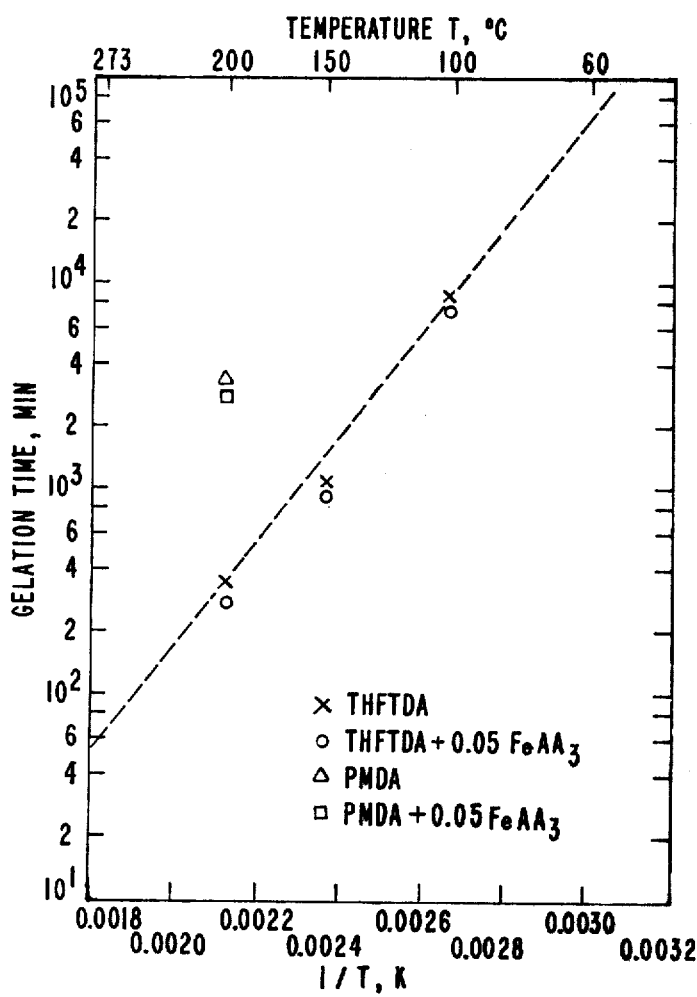
FIG. 3 is a graph of gelation time versus temperature for anhydride-poly(propylene oxide) polymers.

Some experiments were also carried out at higher temperature, for which gelation times were measured. Results are indicated in FIG. 3. Because of esterification following anhydride ring opening, it appears that a cross-linked network can be formed and gelation may occur in 150 hr. at 373°K (100°C). The apparent upward curvature at lower temperatures is probably real, but even if it isn't the relative rate of anhydride opening would be approximately six times faster than esterification at 333°K (60°C), indicating that negligible esterification would take place under normal low-temperature curing conditions for this system.

Table III shows some results obtained for chain extension and cross-linking of poly(ethylene oxide), poly(butadienes), and a reduced saturated poly(-butadiene). The higher temperature, 463°K (190°C), was used to dissolve the anhydride in the prepolymer. For these prepolymers, considerable chain extension and some cross-linking took place during the dissolution, as indicated by high initial intrinsic viscosities and gel formation within 10 minutes at 463°K in some cases.

TABLE III

| | Prepolymer Chain Extension with THFTDA | | | | |
|---|---|---|---|---|---|
| Prepolymer | Time | Temp (°C) | Mole ratio, AN/OH | $[\eta]$, initial[a] kg/m³ | $[\eta]$, final[a] kg/m³ |
| Poly(ethylene oxide)[b] | 66 hr | 72 | 1.05[c] | 0.8 | 1.6 |
| Telagen-S[d] | 10 min | 190 | 1.05 | 0.8 | 2.3 |
| Telagen-S[d] | 1 hr | 190 | 1.16[c] | — | Gel |
| Telagen-S[d] | 18 hr | 72 | 1.05 | — | Gel |
| Hycar HTB[c] | 10 min | 190 | 1.00[c] | 0.6 | 6.4 |

TABLE III-continued

| Prepolymer | Prepolymer Chain Extension with THFTDA | | | [η], initial[a] kg/m³ | [η], final[a] kg/m³ |
|---|---|---|---|---|---|
| | Time | Temp (°C) | Mole ratio, AN/OH | | |
| Butarez HTS[f] | 10 min | 190 | 1.05 | 1.5 | 3.0 |
| Butarez HTS[f] | 18 min | 72 | 1.05 | — | Gel |
| Poly-BD, CN-15[g] | 10 min | 190 | 1.05 | — | Gel |
| Poly-BD, R-45M[g] | 10 min | 190 | 1.05 | — | Gel |
| Poly-BD, R-15M[g] | 10 min | 190 | 1.05 | — | Gel |
| Poly-BD, R-45HT[g] | 10 min | 190 | 1.05 | — | Gel |
| Poly-BD, CS-15[g] | 10 min | 190 | 1.05 | — | Gel |

[a]Viscosities were obtained by single-point measurements using ηsp/C = [η] + 0.4 [η]²C
[b]A. G. Fluka, mol wt 2000
[c]Contained FeAA/anhydride mole ratio = 0.05
[d]Saturated poly(butadiene) α,ω-diol, GT and R, Lot 242 AM 148AH, hydroxyl 0.91 eq/kg.
[e]Poly(butadiene) α,ω-diol, B. F. Goodrich, Lot V-74, hydroxyl 0.38 eq/kg.
[f]Poly(butadiene) α,ω-diol, Phillips Petroleum, Lot 4760, hydroxyl 0.51 eq/kg.
[g]Hydroxy-terminated poly(butadienes). ARCO Chemical, CN-15, Lot 003061, hydroxyl 0.58 eq/kg; R-45M, Lot 008281, hydroxyl 0.70 meq/g; R-15M, Lot 710291, hydroxyl 0.65 eq/kg; R-45HT, Lot 006041, hydroxyl 0.84 meq/g; CS-15, Lot 912211, hydroxyl 0.62 eq/kg. (All hydroxyl values given are from suppliers' data).

It has been gound that THFTDA readily chain extends PPO to high molecular weights in the presence of FeAA catalyst at 343°K (70°C) or lower. The reaction with hydrocarbon prepolymers appears to take place at higher rates, even in the absence of catalyst.

It is to be understood that only preferred embodiments of the invention have been described, and that numerous substitutions, alterations and modifications are all permissible without departing from the spirit and scope of the invention as defined in the following claims.

What is claimed is:

1. A method of forming a polymer having a molecular weight of at least 20,000 comprising the steps of: reacting at a temperature less than 100°C a liquid polymeric polyol having a molecular weight of from 1,000 to 5,000 and a functionality of from 1.7 to 3.0 with a tetrafunctional organic dianhydride in which the dianhydride is present in a stoichiometric excess amount of less than 10% in the presence of a catalytic amount of a metal acetyl acetonate to form said polymer.

2. A method according to claim 1 in which the dianhydride is selected from compounds of the formula:

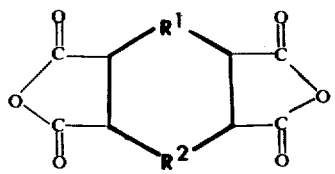

where R¹ is $(CH_2)_n$, divalent oxygen, monocyclic arylene or aryl keto aryl and R² is $(CH_2)_n$ where $n$ is 0 or 1.

3. A method according to claim 2 in which the dianhydride is selected from the group consisting of tetrahydrofuran tetracarboxylic dianhydride, pyromellitic dianhydride and benzophenone tetracarboxylic dianhydride.

4. A method according to claim 3 in which the dianhydride to hydroxyl ratio is about 1.05.

5. A method according to claim 3 in which the dianhydride is tetrahydrofuran tetrocarboxylic dianhydride.

6. A method according to claim 3 in which the molar ratio of catalyst to anhydride is from 0.001 to 0.5.

7. A method according to claim 5 in which the molar ratio of catalyst to anhydride is from 0.02 to 0.2.

8. A method according to claim 7 in which the catalyst is ferric acetyl acetonate.

9. A method according to claim 3 in which the temperature during a first period of reaction is no more than 75°C.

10. A method according to claim 3 in which the reaction is conducted in bulk.

11. A method according to claim 3 in which the liquid prepolymer has a molecular weight from 1,000 to 5,000 and a functionality from about 1.7 to 2.3.

12. A method according to claim 9 further including the steps of reacting the mixture of polyol and dianhydride during a second period of reaction at a temperature above 100°C to form a cross-linked, gelled polymer.

13. A method according to claim 3 in which the metal acetyl acetonate is selected from iron, copper or nickel.

14. A method according to claim 13 in which the polyol is selected from hydroxyl terminated liquid polymeric dienes and polyether glycols.

* * * * *